(12) United States Patent
Vermeulen et al.

(10) Patent No.: US 9,381,476 B2
(45) Date of Patent: Jul. 5, 2016

(54) DRINK DISPENSER

(71) Applicant: MDS GLOBAL HOLDING PLC., Sliema (MT)

(72) Inventors: Martin Vermeulen, Renswoude (NL); Marcel Hendrikus Simon Weijers, Assen (NL)

(73) Assignee: MDS Global Holding p.l.c., Gzira (MT)

( * ) Notice: Subject to any disclaimer, the term of this patent is extended or adjusted under 35 U.S.C. 154(b) by 172 days.

(21) Appl. No.: 14/333,677

(22) Filed: Jul. 17, 2014

(65) Prior Publication Data

US 2016/0016129 A1    Jan. 21, 2016

(51) Int. Cl.
*B01F 3/04* (2006.01)
*A23L 2/00* (2006.01)
*A47J 31/44* (2006.01)

(52) U.S. Cl.
CPC .............. *B01F 3/04808* (2013.01); *A23L 2/00* (2013.01); *A47J 31/44* (2013.01); *B01F 3/04099* (2013.01); *B01F 3/04588* (2013.01); *B01F 2003/049* (2013.01)

(58) Field of Classification Search
CPC ......... A23L 2/00; B01F 3/04; B01F 3/04099; B01F 3/04531; B01F 3/04588; B01F 2003/04645; B01F 2003/0468; B01F 3/04787; B01F 3/04808; A47J 31/44
USPC .......... 261/72.1, 83, 84, 119.1, 121.1, DIG. 7
See application file for complete search history.

(56) References Cited

U.S. PATENT DOCUMENTS

| | | | | |
|---|---|---|---|---|
| 1,436,886 | A | * 11/1922 | Leibing | B01F 3/04531 261/113 |
| 5,422,045 | A | * 6/1995 | Notar | B01F 3/04808 261/140.1 |

FOREIGN PATENT DOCUMENTS

| | | |
|---|---|---|
| CA | 2048101 C | 1/1995 |
| EP | 0471343 A3 | 2/1992 |
| EP | 1514836 A1 | 3/2005 |
| WO | 2006128695 A2 | 12/2006 |

OTHER PUBLICATIONS

US 4,530,803, 07/1985, Kuckens (withdrawn)

* cited by examiner

*Primary Examiner* — Robert A Hopkins
(74) *Attorney, Agent, or Firm* — Wolf, Greenfield & Sacks, P.C.

(57) ABSTRACT

A carbonator including a sealed container, a carbonation flow path defining element located inside the sealed container and including a water inlet, a carbonation gas inlet and a carbonated water outlet, a carbonation rotor disposed along the carbonation flow path for mixing carbonation gas and water, thereby producing carbonated water, and directing the carbonated water through the carbonated water outlet into the interior of the sealed container, a water cooling coil disposed within the sealed container, a refrigerating coil disposed within the sealed container in direct heat exchange cooling engagement with the carbonated water and in indirect heat exchange cooling engagement with the water cooling coil via the carbonated water and a carbonated water circulating rotor disposed outside of the carbonation flow path defining element and being operative to circulate the carbonated water in heat exchange engagement with the water cooling coil and the refrigerating coil.

15 Claims, 7 Drawing Sheets

DRINK DISPENSER

FIELD OF THE INVENTION

The present invention relates to drink dispensers generally and more particularly to drink dispensers which include carbonation functionality.

BACKGROUND OF THE INVENTION

A great variety of drink dispensers are known in the patent literature.

European Published Patent Application EP 1,514,836, published Mar. 16, 2003, of CELLI S.p.A, describes an Enhanced Refrigerating Carbonator for drinks, wherein there is provided, as stated in the Abstract "An enhanced carbonator for carbonating drinks, comprising a sealed container (2), provided at least with a first . . . inlet (31) for supplying the drink to be carbonated, a second inlet (32) for supplying the gas, under a certain pressure, to be added to the drink and at least an outlet (33) of the carbonated drink in correspondence with which is integrated a flow control unit (35) for regulating the flow of the carbonated drink. Inside the container is present a rotor (4) and outside actuator means (5) able to create a rotating magnetic field which remotely commands a continuation rotation of said rotor (4), the container (2) also comprise in its interior at least an evaporator (7) and a coil (8), immersed in the evaporated drink itself, able to create a substantially homogeneous cooling both of the carbonated drink and of at least any other drink which traverses the coil thanks to the presence of the rotor (4)."

In attempting to create a compact commercial product based on the foregoing teaching, applicant switched the general positions of the evaporator and the coil and initially encountered a problem of poor cold water dispensing performance. This was presumably due to an insufficient level of water circulation in the sealed container.

In order to overcome this problem, applicant increased the power, speed and size of the rotor, but this increased the amount of bubbles generated and present in the vicinity of the evaporator, which lowered the quantity of water circulating in contact with the evaporator and caused the evaporator to freeze up.

In an attempt to alleviate the problem of too many bubbles, applicant partially closed the gas inlet. This improved cool water dispensing performance but the evaporator still tended to freeze up. More seriously, the level of carbonation decreased to an unacceptable level.

The present invention represents a solution to the above problems.

SUMMARY OF THE INVENTION

The present invention seeks to provide an improved drink dispenser which includes carbonation functionality. There is thus provided in accordance with a preferred embodiment of the present invention a drink dispenser including a carbonator including a sealed container, a carbonation flow path defining element located inside the sealed container and including a water inlet, a carbonation gas inlet and a carbonated water outlet, a carbonation rotor disposed along the carbonation flow path for mixing carbonation gas and water, thereby producing carbonated water, and directing the carbonated water through the carbonated water outlet into the interior of the sealed container, a water cooling coil disposed within the sealed container, a refrigerating coil disposed within the sealed container in direct heat exchange cooling engagement with the carbonated water and in indirect heat exchange cooling engagement with the water cooling coil via the carbonated water and a carbonated water circulating rotor disposed outside of the carbonation flow path defining element and being operative to circulate the carbonated water in heat exchange engagement with the water cooling coil and the refrigerating coil and a selectable drink dispensing assembly for dispensing a drink in response to a user selection, the drink selectably including at least one of cooled water from the water cooling coil and the carbonated water.

There is also provided in accordance with another preferred embodiment of the present invention a carbonator including a sealed container, a carbonation flow path defining element located inside the sealed container and including a water inlet, a carbonation gas inlet and a carbonated water outlet, a carbonation rotor disposed along the carbonation flow path for mixing carbonation gas and water, thereby producing carbonated water and directing the carbonated water through the carbonated water outlet into the interior of the sealed container, a water cooling coil disposed within the sealed container, a refrigerating coil disposed within the sealed container in direct heat exchange cooling engagement with the carbonated water and in indirect heat exchange cooling engagement with the water cooling coil via the carbonated water and a carbonated water circulating rotor disposed outside of the carbonation flow path defining element and being operative to circulate the carbonated water in heat exchange engagement with the water cooling coil and the refrigerating coil.

There is further provided in accordance with yet another preferred embodiment of the present invention a drink dispenser including a water boiler, a carbonator including a sealed container, a carbonation flow path defining element located inside the sealed container and including a water inlet, a carbonation gas inlet and a carbonated water outlet, a carbonation rotor disposed along the carbonation flow path for mixing carbonation gas and water, thereby producing carbonated water, and directing the carbonated water through the carbonated water outlet into the interior of the sealed container, a water cooling coil disposed within the sealed container, a refrigerating coil disposed within the sealed container in direct heat exchange cooling engagement with the carbonated water and in indirect heat exchange cooling engagement with the water cooling coil via the carbonated water and a carbonated water circulating rotor disposed outside of the carbonation flow path defining element and being operative to circulate the carbonated water in heat exchange engagement with the water cooling coil and the refrigerating coil and a selectable drink dispensing assembly for dispensing a drink in response to a user selection, the drink selectably including at least one of hot water from the water boiler, cooled water from the water cooling coil and the carbonated water.

Preferably, the carbonator also includes a motor which drives both the carbonation rotor and the carbonated water circulating rotor. Additionally, the carbonation rotor and the carbonated water circulating rotor are differently configured.

In accordance with a preferred embodiment of the present invention the carbonation flow path defining element includes an upstanding hollow cylindrical portion. Additionally, the upstanding hollow cylindrical portion is open at a top end thereof.

BRIEF DESCRIPTION OF THE DRAWINGS

The present invention will be understood and appreciated more fully from the following detailed description in which.

DETAILED DESCRIPTION OF A PREFERRED EMBODIMENT

Figure 1:
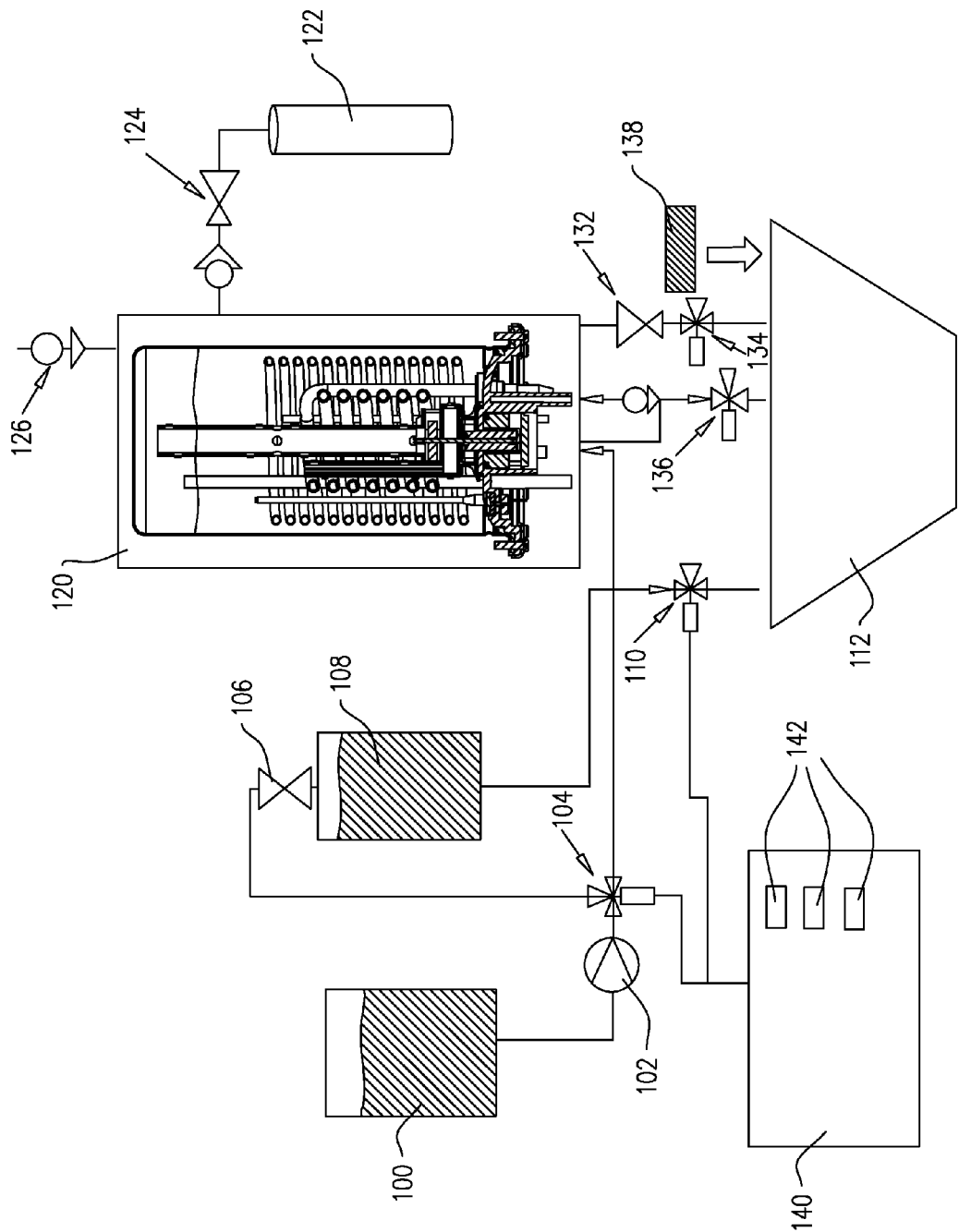
FIG. 1 is a simplified schematic illustration of a drink dispenser constructed and operative in accordance with a preferred embodiment of the present invention.

Reference is now made to FIG. 1, which is a simplified schematic illustration of a drink dispenser constructed and operative in accordance with a preferred embodiment of the present invention. As seen in FIG. 1, the drink dispenser preferably includes a fresh water reservoir 100 which preferably receives a supply of fresh water from a connection to a water line (not shown) and may include a water filter. A water pump 102 preferably supplies water from reservoir 100 via a controllable valve 104 and a boiler valve 106 to a water boiler 108. Hot water from water boiler is supplied via a controllable hot water dispensing valve 110 to a drink container 112.

Water from reservoir 100 is also supplied via controllable valve 104 to a carbonator 120, which is of a special construction, as described in detail hereinbelow, and preferably includes a sealed container, a carbonation flow path defining element located inside the sealed container and including a water inlet, a carbonation gas inlet and a carbonated water outlet, a carbonation rotor disposed along the carbonation flow path for mixing carbonation gas and water, thereby producing carbonated water, and directing the carbonated water through the carbonated water outlet into the interior of the sealed container, a water cooling coil disposed within the sealed container, a refrigerating coil disposed within the sealed container in direct heat exchange cooling engagement with the carbonated water and in indirect heat exchange cooling engagement with the water cooling coil via the carbonated water and a carbonated water circulating rotor disposed outside of the carbonation flow path defining element and being operative to circulate the carbonated water in heat exchange engagement with the water cooling coil and the refrigerating coil.

Alternatively, fresh water reservoir 100 may be obviated and water may be supplied directly from the water line via water pump 102 and controllable valve 104 to water boiler 108 and carbonator 120.

Carbonator 120 preferably receives a supply of pressurized carbon dioxide from a tank 122 via a pressure reducer 124. Carbonator 120 is preferably provided with a vent 126.

Cooled, carbonated water from carbonator 120 is preferably supplied via a pressure reducer 132 and a controllable valve 134 to drink container 112.

Cooled, non-carbonated water from carbonator 120 is preferably supplied via a controllable valve 136 to drink container 112.

A selectable flavoring material is preferably supplied to drink container 112 from a flavoring material squeezing assembly 138.

A controller 140, having an associated user interface 142, is preferably operative to control the operation of controllable valves 104, 110, 134 and 136 and squeezing assembly 138. Preferably, controller 140 is also operative to control water pump 102 and water boiler 108.

Figure 2:
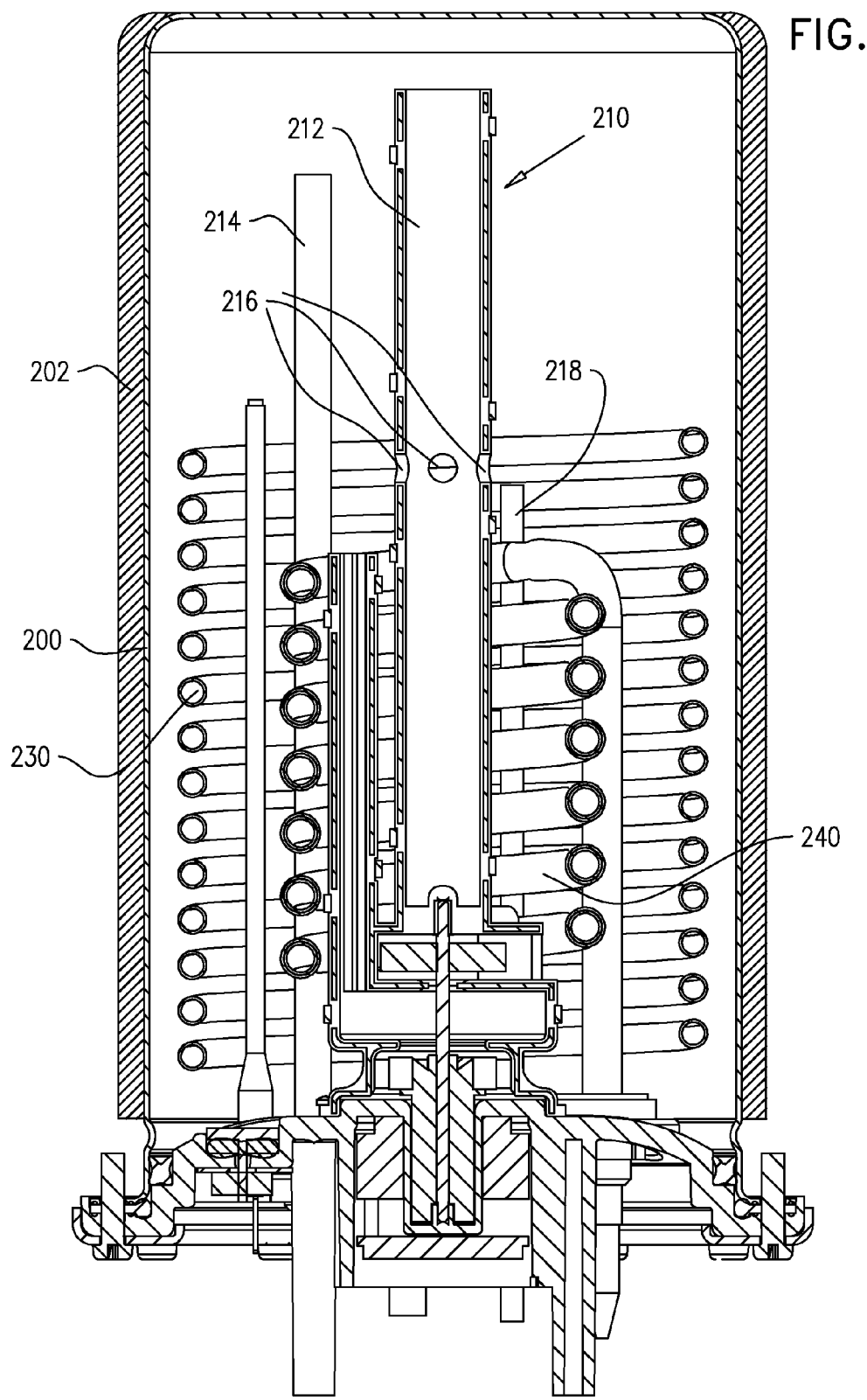
FIG. 2 is a simplified sectional illustration of a carbonator, constructed and operative in accordance with a preferred embodiment of the present invention, forming part of the drink dispenser of FIG. 1.
Figure 3:
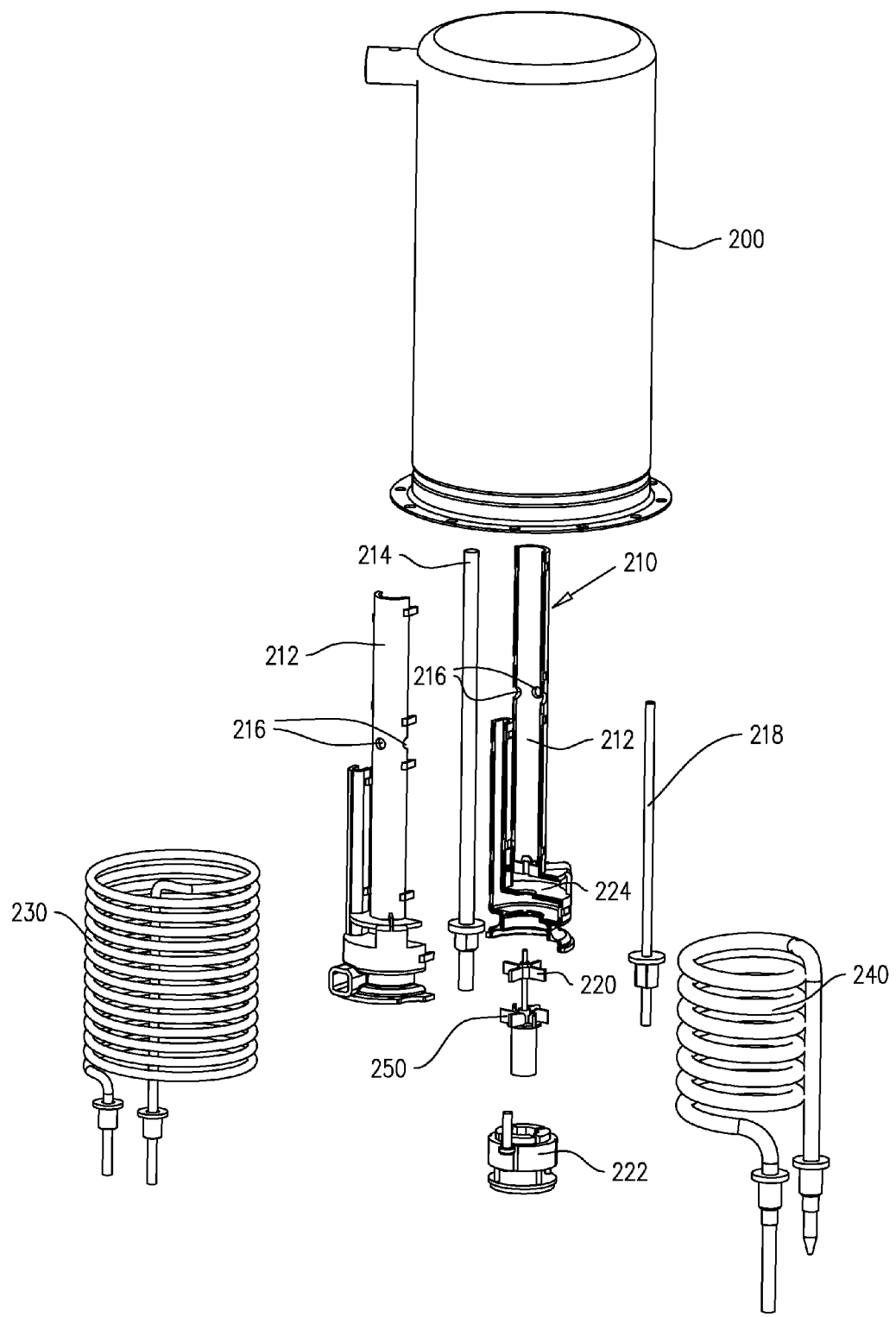
FIG. 3 is a simplified exploded view illustration of the carbonator of FIG. 2.

Reference is now made to FIG. 2, which is a simplified sectional illustration of a preferred embodiment of carbonator 120, constructed and operative in accordance with a preferred embodiment of the present invention, forming part of the drink dispenser of FIG. 1, and to FIG. 3, which is a simplified exploded view illustration of the carbonator of FIG. 2.

As seen in FIGS. 2 and 3, it is seen that the carbonator 120 preferably includes a sealed container 200, preferably formed of stainless steel, which is at least partially surrounded by a thermal insulation jacket 202. A carbonation flow path defining element 210, which may be defined in whole or in part by a pump housing, is located inside the sealed container. The carbonation flow path defining element 210 preferably comprises an upstanding hollow cylindrical portion 212, which is open at a top end thereof and thus allows pressurized carbon dioxide to enter from a region at the top of the interior of sealed container 200. The carbon dioxide is supplied to the interior of the sealed container 200 from tank 122 via pressure reducer 124 at a carbon dioxide inlet 214.

The cylindrical portion 212 preferably includes one or more water inlet apertures 216 formed in a side wall thereof, where water from the interior of the sealed container 200 enters the cylindrical portion 212. The water is preferably supplied to the interior of the sealed container 200 from reservoir 100 via water pump 102 and controllable valve 104 at a water inlet 218.

A carbonation rotor 220, driven by an electric motor 222 and located in a carbonation rotor housing portion 224 located just below cylindrical portion 212 mixes the water and the carbon dioxide, producing carbonated water, which is forced outwardly of the rotor housing portion 224 via outlet apertures 226 (FIG. 4A) formed therein and which, due to the presence of carbon dioxide bubbles therein, moves upwardly and outwardly in the sealed container from the carbonation rotor housing portion 224. This flow is shown by arrows in FIGS. 4A and 5.

A separate non-carbonated water cooling coil 230 is disposed within the sealed container 200 and immersed within the carbonated water located in container 200. Water cooling coil 230 supplies cooled, non-carbonated water via controllable valve 136 to drink container 112.

A refrigerating coil 240 is disposed within the sealed container 200 in direct heat exchange cooling engagement with the carbonated water and in indirect heat exchange cooling engagement with the water cooling coil 230 via the carbonated water.

It is a particular feature of the present invention that a carbonated water circulating rotor 250 is provided and disposed outside of the carbonation flow path defining element 210 and is operative to circulate the carbonated water in heat exchange engagement with the water cooling coil 230 and the refrigerating coil 240. Preferably, the carbonated water circulating rotor 250 is driven by the same motor 222 as the carbonation rotor 220. A significant advantage of having two rotors, one involved in carbonation and one not, is that the degree of mixing and the amount of circulation can be decoupled from each other as by selecting the dimensions of the two rotors to be different. Preferably, rotor 250 provides a greater volume of water circulation than does rotor 220. The flow produced by rotor 250 is shown by arrows in FIGS. 4B and 6.

Figure 4A:
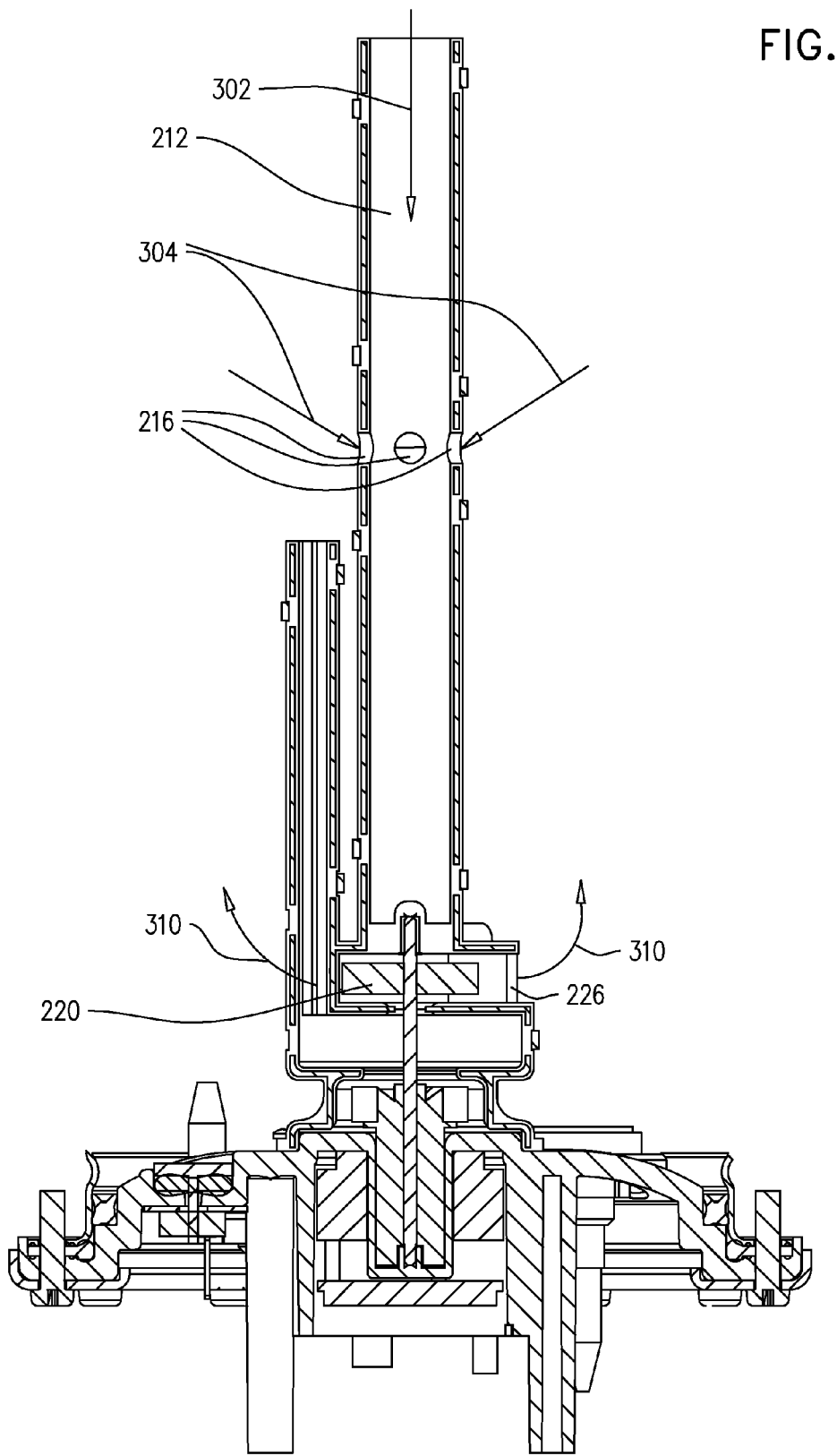
FIGS. 4A and 4B are simplified pictorial illustrations of a carbonation flow path and a water circulation flow path provided by the carbonator of FIGS. 2 and 3.
Figure 4B:
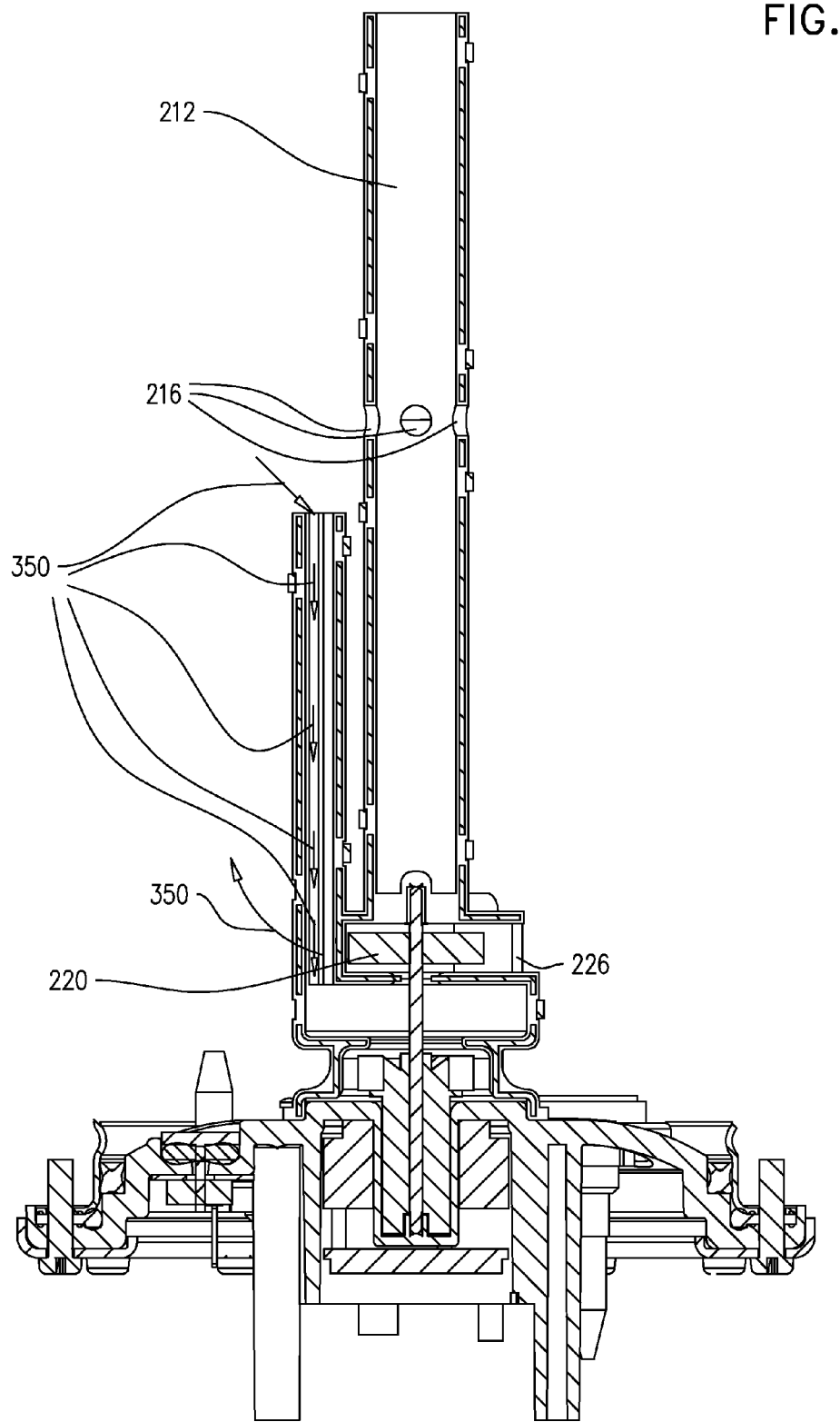
Figure 5:
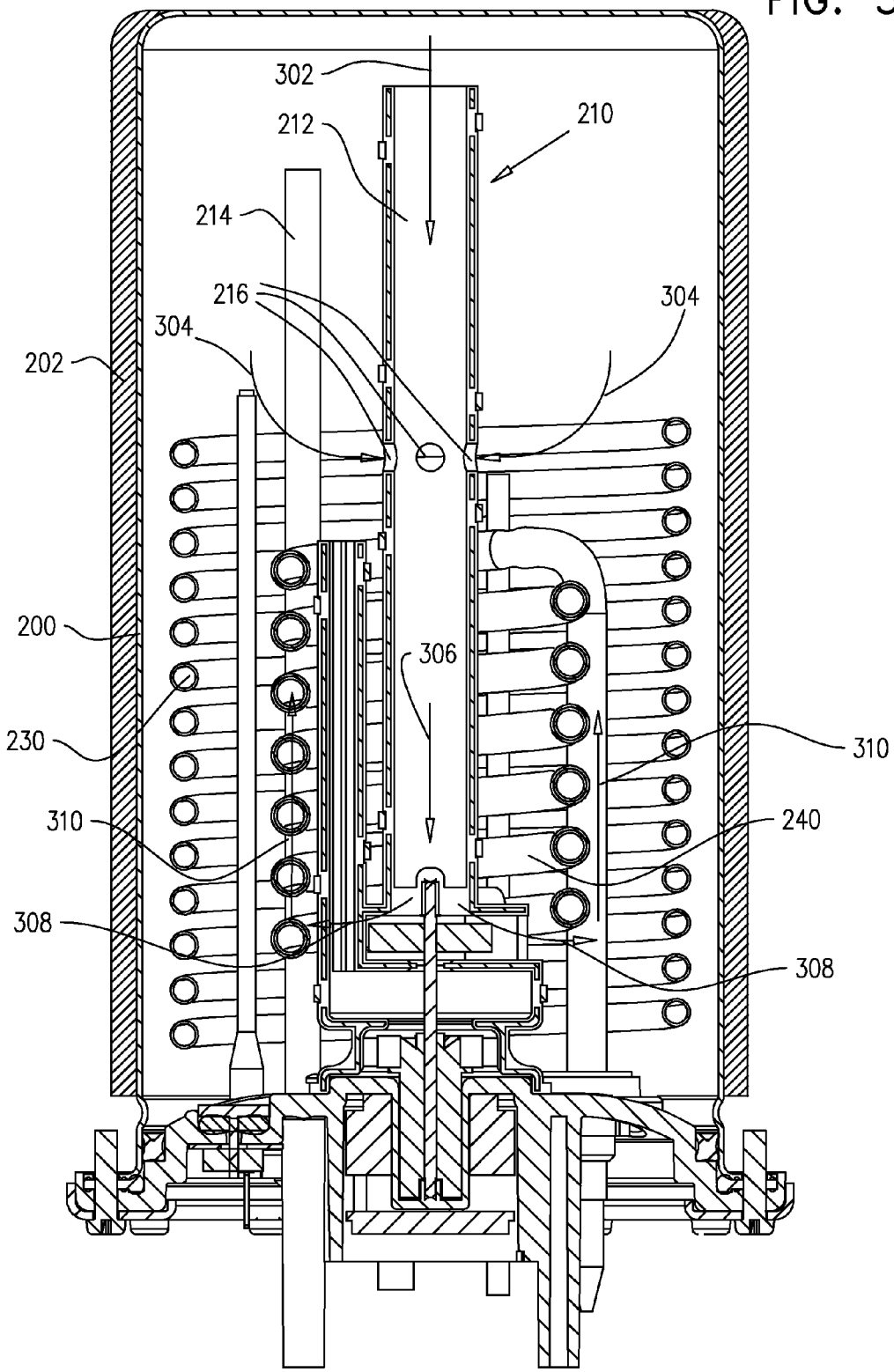
FIG. 5 is a simplified pictorial illustration showing a carbonation flow provided by the carbonator of FIGS. 2 & 3.
Figure 6:
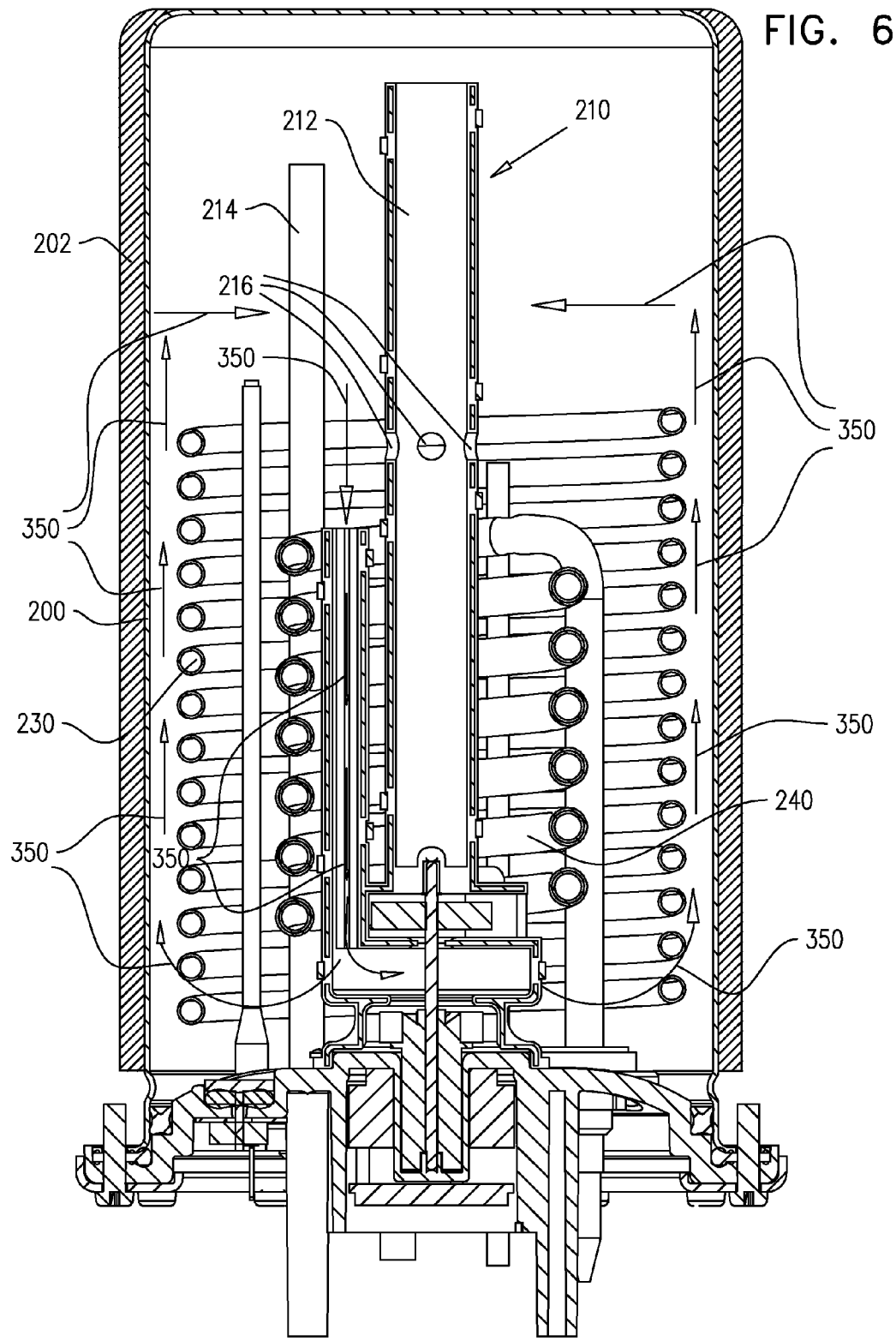
FIG. 6 is a simplified pictorial illustration of a water circulation flow provided by the carbonator of FIGS. 2 & 3.

Reference is now made to FIGS. 4A and 4B, which are simplified pictorial illustrations of a carbonation flow path and a water circulation flow path provided by the carbonator of FIGS. 2 and 3, to FIG. 5, which is a simplified pictorial illustration showing a carbonation flow provided by the carbonator of FIGS. 2 & 3, and to FIG. 6, which is a simplified pictorial illustration of a water circulation flow provided by the carbonator of FIGS. 2 & 3.

As described hereinabove, pressurized carbon dioxide is supplied to the interior of the sealed container 200 through carbon dioxide inlet 214 and is located in the region at the top of the interior of sealed container 200. As seen in FIGS. 4A and 5, the carbon dioxide flows into the interior of cylindrical portion 212 of carbonation flow path defining element 210 as indicated by arrow 302. Water preferably enters cylindrical portion 212 of carbonation flow path defining element 210 through water inlet apertures 216, as indicated by arrows 304. The water and carbon dioxide are mixed, inter alia, by carbonation rotor 220 to form carbonated water, as indicated by arrow 306, which then exits rotor housing portion 224 through outlet apertures 226, as indicated by arrows 308. As described hereinabove, due to the presence of carbon dioxide bubbles in the carbonated water, the carbonated water moves upwardly and outwardly in the sealed container from the carbonation rotor housing portion 224, as indicated by arrows 310.

As described hereinabove, the carbonated water is circulated in heat exchange engagement with the water cooling coil 230 and the refrigerating coil 240 by carbonated water circulating rotor 250 which is disposed outside of the carbonation flow path defining element 210. The flow produced by rotor 250 is shown by arrows 350 in FIGS. 4B and 6.

It will be appreciated by persons skilled in the art that the present invention is not limited by what has been particularly shown and described hereinabove. Rather the scope of the invention includes both combinations and subcombinations of various features described as well improvements and modifications that would occur to persons skilled in the art upon reading the foregoing description.

The invention claimed is:

1. A drink dispenser comprising:
    a carbonator including:
        a sealed container;
        a carbonation flow path defining element located inside said sealed container and comprising:
            a water inlet;
            a carbonation gas inlet; and
            a carbonated water outlet;
        a carbonation rotor disposed along said carbonation flow path for mixing carbonation gas and water, thereby producing carbonated water, and directing said carbonated water through said carbonated water outlet into the interior of said sealed container;
        a water cooling coil disposed within said sealed container;
        a refrigerating coil disposed within said sealed container in direct heat exchange cooling engagement with said carbonated water and in indirect heat exchange cooling engagement with said water cooling coil via said carbonated water; and
        a carbonated water circulating rotor disposed outside of said carbonation flow path defining element and being operative to circulate said carbonated water in heat exchange engagement with said water cooling coil and said refrigerating coil; and
    a selectable drink dispensing assembly for dispensing a drink in response to a user selection, the drink selectably including at least one of cooled water from said water cooling coil and said carbonated water.

2. A drink dispenser according to claim 1 and wherein said carbonator also comprises a motor which drives both said carbonation rotor and said carbonated water circulating rotor.

3. A drink dispenser according to claim 2 and wherein said carbonation rotor and said carbonated water circulating rotor are differently configured.

4. A drink dispenser according to claim 1 and wherein said carbonation flow path defining element comprises an upstanding hollow cylindrical portion.

5. A drink dispenser according to claim 4 and wherein said upstanding hollow cylindrical portion is open at a top end thereof.

6. A carbonator comprising:
    a sealed container;
    a carbonation flow path defining element located inside said sealed container and comprising:
        a water inlet;
        a carbonation gas inlet; and
        a carbonated water outlet;
    a carbonation rotor disposed along said carbonation flow path for mixing carbonation gas and water, thereby producing carbonated water and directing said carbonated water through said carbonated water outlet into the interior of said sealed container;
    a water cooling coil disposed within said sealed container;
    a refrigerating coil disposed within said sealed container in direct heat exchange cooling engagement with said carbonated water and in indirect heat exchange cooling engagement with said water cooling coil via said carbonated water; and
    a carbonated water circulating rotor disposed outside of said carbonation flow path defining element and being operative to circulate said carbonated water in heat exchange engagement with said water cooling coil and said refrigerating coil.

7. A carbonator according to claim 6 and wherein said carbonator also comprises a motor which drives both said carbonation rotor and said carbonated water circulating rotor.

8. A carbonator according to claim 7 and wherein said carbonation rotor and said carbonated water circulating rotor are differently configured.

9. A carbonator according to claim 6 and wherein said carbonation flow path defining element comprises an upstanding hollow cylindrical portion.

10. A carbonator according to claim 9 and wherein said upstanding hollow cylindrical portion is open at a top end thereof.

11. A drink dispenser comprising:
    a water boiler;
    a carbonator including:
        a sealed container;
        a carbonation flow path defining element located inside said sealed container and comprising:
            a water inlet;
            a carbonation gas inlet; and
            a carbonated water outlet;
        a carbonation rotor disposed along said carbonation flow path for mixing carbonation gas and water, thereby producing carbonated water, and directing said carbonated water through said carbonated water outlet into the interior of said sealed container;
        a water cooling coil disposed within said sealed container;
        a refrigerating coil disposed within said sealed container in direct heat exchange cooling engagement with said carbonated water and in indirect heat exchange cooling engagement with said water cooling coil via said carbonated water; and a carbonated water circulating rotor disposed outside of said carbonation flow path defining element and being operative to circulate said carbonated water in heat exchange engagement with said water cooling coil and said refrigerating coil; and a selectable drink dispensing assembly for dispensing a drink in response to a user selection, the drink selectably including at least one of hot water from said water boiler, cooled water from said water cooling coil and said carbonated water.

12. A drink dispenser according to claim 11 and wherein said carbonator also comprises a motor which drives both said carbonation rotor and said carbonated water circulating rotor.

13. A drink dispenser according to claim 12 and wherein said carbonation rotor and said carbonated water circulating rotor are differently configured.

14. A drink dispenser according to claim 11 and wherein said carbonation flow path defining element comprises an upstanding hollow cylindrical portion.

15. A drink dispenser according to claim 14 and wherein said upstanding hollow cylindrical portion is open at a top end thereof.

* * * * *